(12) United States Patent
Matsuo

(10) Patent No.: US 11,675,554 B1
(45) Date of Patent: Jun. 13, 2023

(54) INDUSTRIAL PRINTING SYSTEM, SERVER, AND VARIABLE PRINTING METHOD THAT PROMOTES VARIABLE PRINTING PROOF-READING DELAYS WITH SUBSTITUTE PART

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/827,627

(22) Filed: May 27, 2022

(51) Int. Cl.
*G06F 3/12* (2006.01)

(52) U.S. Cl.
CPC .......... *G06F 3/1243* (2013.01); *G06F 3/1205* (2013.01); *G06F 3/1259* (2013.01)

(58) Field of Classification Search
CPC ..... G06F 3/1243; G06F 3/1205; G06F 3/1259
See application file for complete search history.

(56) References Cited

U.S. PATENT DOCUMENTS

| | | | | |
|---|---|---|---|---|
| 11,334,302 | B1* | 5/2022 | Bailey | G06F 3/1275 |
| 2004/0268231 | A1* | 12/2004 | Tunning | G06F 40/154 |
| | | | | 715/236 |
| 2012/0137208 | A1* | 5/2012 | Ito | H04N 1/32776 |
| | | | | 715/234 |
| 2015/0302281 | A1* | 10/2015 | Naka | G06F 3/1243 |
| | | | | 358/1.15 |
| 2016/0274822 | A1* | 9/2016 | Iwasaki | G06F 3/1288 |
| 2020/0293253 | A1* | 9/2020 | Kobashi | G06F 3/1264 |

FOREIGN PATENT DOCUMENTS

JP 2010-277217 A 12/2010

* cited by examiner

*Primary Examiner* — Iriana Cruz
(74) *Attorney, Agent, or Firm* — Hawaii Patent Sendees; Nathaniel K. Fedde; Kenton N. Fedde

(57) ABSTRACT

Provided is an industrial printing system that reduces the risk of delays. A status management unit manages the completion status of a part on a page for variable printing. A process control unit creates a job ticket by using a substitute part for an incomplete parts managed by the status control unit, creates the substitute part as link data, and saves a position of a record and a page containing the substitute part as job attribute information. A process management unit performs a prepress process or a printing process by using the job ticket created by the process control unit. A post-processing unit performs post-processing according to the job ticket for the record or the page that has been performed prepress process or printing process by the process management unit.

15 Claims, 7 Drawing Sheets

FIG.6

```
1. PART AA2 (40 min) : 60 min
   ├─ PART JG9 (10 min)
   └─ PART 00P (10 min)

2. PART C45 (50 min) : 50 min
3. PART GT7 (30 min) : 30 min
4. PART KE0 (20 min) : 25 min
   └─ PART KK6 (05 min)
      ⋮
```

500

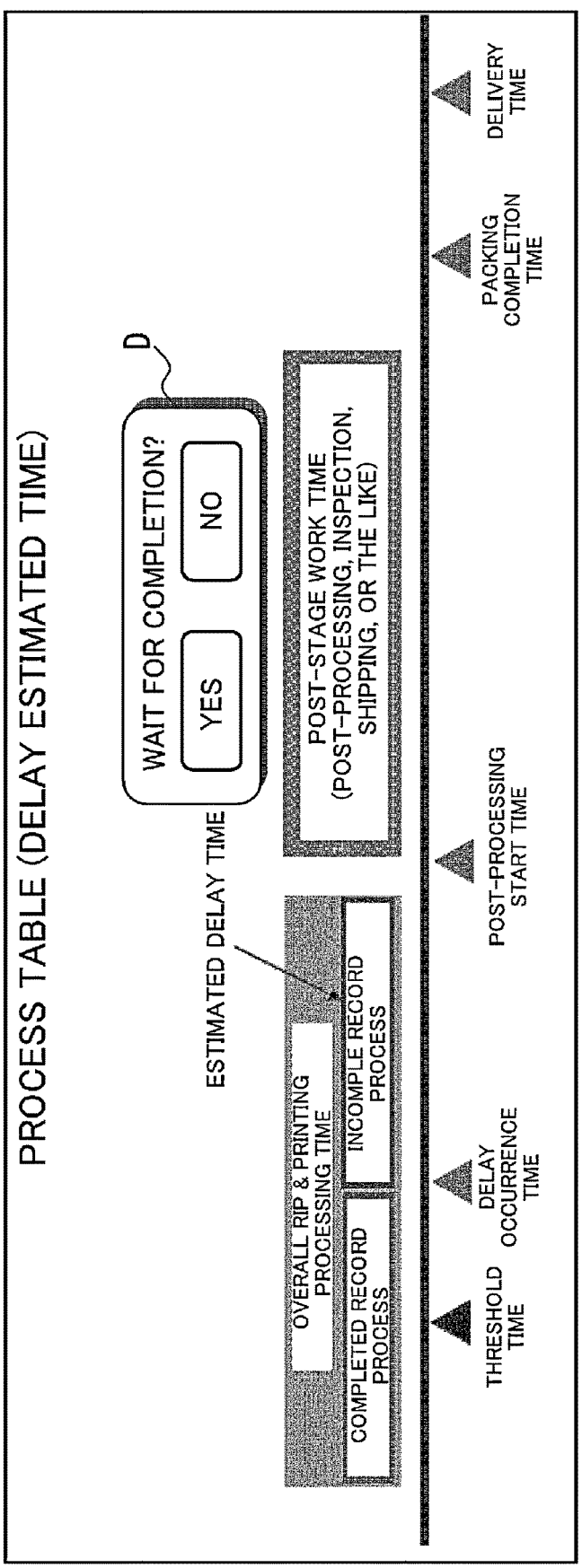

INDUSTRIAL PRINTING SYSTEM, SERVER, AND VARIABLE PRINTING METHOD THAT PROMOTES VARIABLE PRINTING PROOF-READING DELAYS WITH SUBSTITUTE PART

BACKGROUND

The present disclosure specifically relates to an industrial printing system, a server, and a variable printing method for performing variable printing.

Industrial printing, which is called production printing, uses commercial (industrial) printing equipment, and the components of the final product are produced by dividing the work into multiple processes. For example, in the case of bookbinding, the cover, the body (color), the body (black and white), the promotional material, the band, the shipping envelope, and the like, are processed as different jobs, respectively. Then, in the middle of the process, each job is combined and finished a book as a final product.

On the other hand, there is a variable printing technology that prints differently for each record in the database by using a common form, or the like.

As a typical variable printing technology, a print control program and a variable printing system that can easily set an output form for each record on the apparatus side that instructs variable printing are described. In this technology, image layout information that associates each record with an image to be printed is generated based on a database in which a plurality of records is described. In addition, the apparatus information, which the print setting conditions of the apparatus that executes variable printing are described, is acquired. Then, based on the information set by using the database and the apparatus information, the print setting information that associates each record with the print setting condition is generated. It also outputs image layout information and print setting information.

SUMMARY

An industrial printing system of the present disclosure is an industrial printing system that performs variable printing by production printing, including: a status management unit that manages completion status of a part on a page for the variable printing; a process control unit that creates a job ticket by using a substitute part for an incomplete part managed by the status control unit, creates the substitute part as link data, and saves a position of a record and a page containing the substitute part as job attribute information; and a process management unit that performs prepress process or printing process by using the job ticket created by the process control unit.

A server of the present disclosure is a server of an industrial printing system that performs variable printing by production printing, including: a status management unit that manages completion status of a part on a page for the variable printing; a process control unit that creates a job ticket by using a substitute part for an incomplete part managed by the status control unit, creates the substitute part as link data, and saves a position of a record and a page containing the substitute part as job attribute information; a process management unit that performs prepress process or printing process by using the job ticket created by the process control unit; and a post-processing unit that performs post-processing according to the job ticket for a record or a page that has been performed prepress process or printing process by the process management unit.

A variable printing method of the present disclosure is a variable printing method executed by a server of an industrial printing system that performs variable printing by production printing, including the steps of: managing completion status of a part on a page for the variable printing; creating a job ticket by using a substitute part for an incomplete part that is managed; creating the substitute part as link data; saving a position of a record and a page containing the substitute part as job attribute information; and performing prepress process or printing process by using created job ticket.

BRIEF DESCRIPTION OF THE DRAWINGS

FIG. 6 is a conceptual diagram for explaining the estimated delay time in the variable data processing as shown in FIG. 4; and FIG. 7 is a conceptual diagram of calculating the estimated delay time in the variable data processing as shown in FIG. 4.

EMBODIMENT

[Configuration of Industrial Printing System X]

Figure 1:
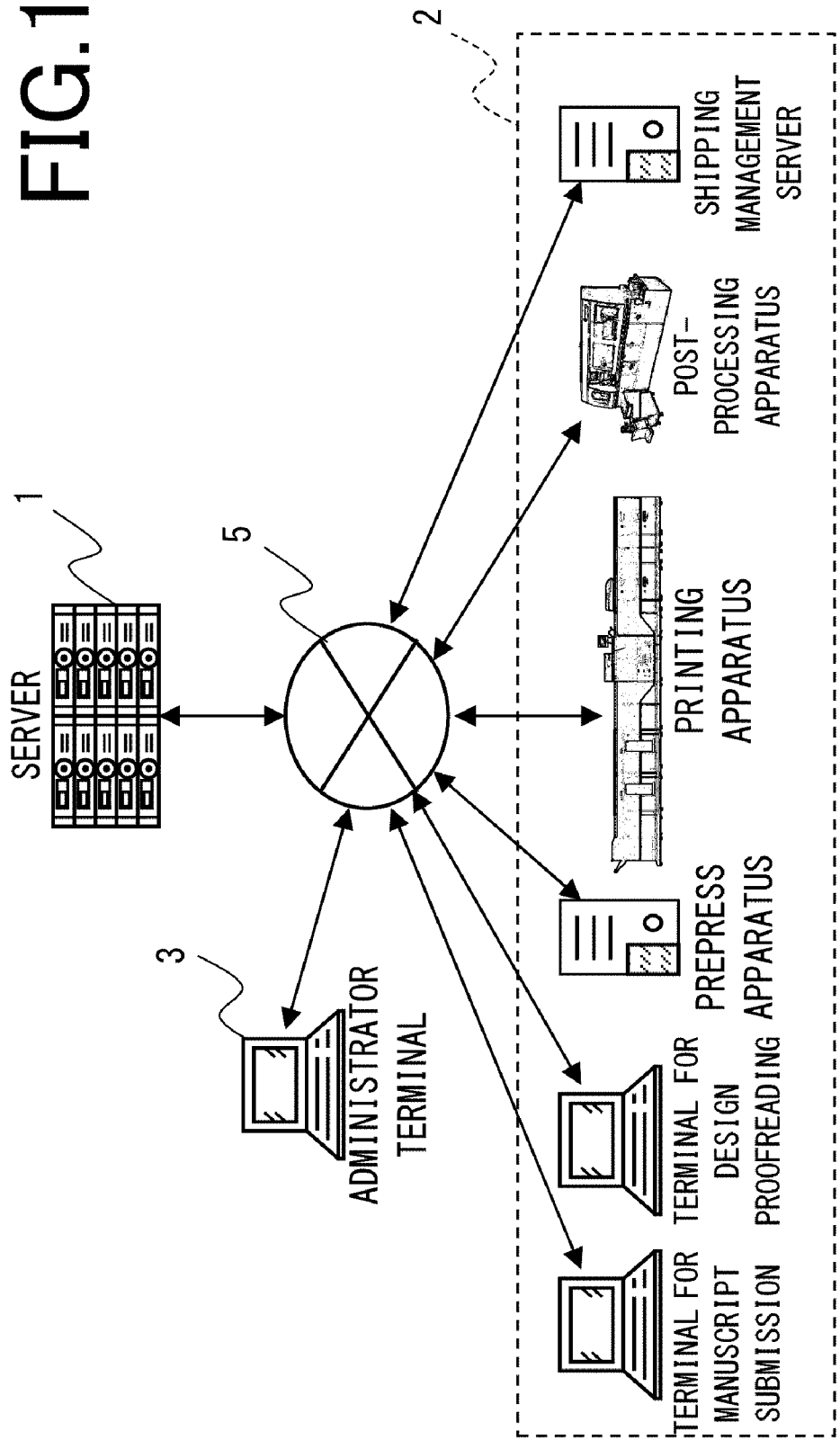
FIG. 1 is a system configuration diagram of an industrial printing system according to an embodiment of the present disclosure.

Firstly, with reference to FIG. 1, the overall system configuration of the industrial printing system X according to the present embodiment is described.

The industrial printing system X according to the present embodiment is a system that executes design and printing in industrial printing (production printing).

Here, in the industrial printing system X according to the present embodiment, the final product such as an output book, or the like, is set as an "order", and each component of the order is set as a job. In the industrial printing system X according to the present embodiment, each job for outputting the order is assigned to a component apparatus 2 and managed by the workflow.

The industrial printing system X according to the present embodiment includes a server 1, the component apparatus 2, and an administrator terminal 3, and each apparatus is connected by a network 5.

The server 1 is a server for designing variable printing in industrial printing, managing a workflow, and executing process management. The server 1 is a PC (Personal Computer) server, a dedicated machine, a general-purpose machine, or the like, settled on a so-called cloud or at a user's place.

On this basis, the server 1 designs a variable document by a dedicated design application software (hereinafter, simply referred to as "application"). Further, the server 1 manages each process of the industrial printing workflow by executing the printing process management application.

Specifically, the server 1 sends and receives various instructions and information to and from the component apparatus 2 for each process in printing, and it manages the status and requests processing for each component apparatus 2.

In addition, the server 1 may be a server that executes a common platform that performs user management, tenant management, security management, notification service for maintenance, prepress management, storage management of each document, management of printing apparatuses, and the like. The above application may run on this server.

The component apparatus 2 is a component that executes various jobs of production printing, and is each apparatus managed by the server 1. The component apparatus 2 includes, for example, a terminal for manuscript submission, a terminal for design proof-reading, a prepress apparatus, a printing apparatus for production printing, a post-processing apparatus, a shipping management server, and the like. In the present embodiment, one of these apparatuses is simply referred to as a component apparatus 2. Among the component apparatuses 2, each terminal or server can be connected to the server 1 via a web browser such as a PC or smartphone, a dedicated application, or the like.
])

The administrator terminal 3 is a terminal used by a printing process administrator, or the like, among users. The administrator terminal allows the user to access the server 1 to design a variable document by GUI, check the progress status, and request processing.

Figure 2:
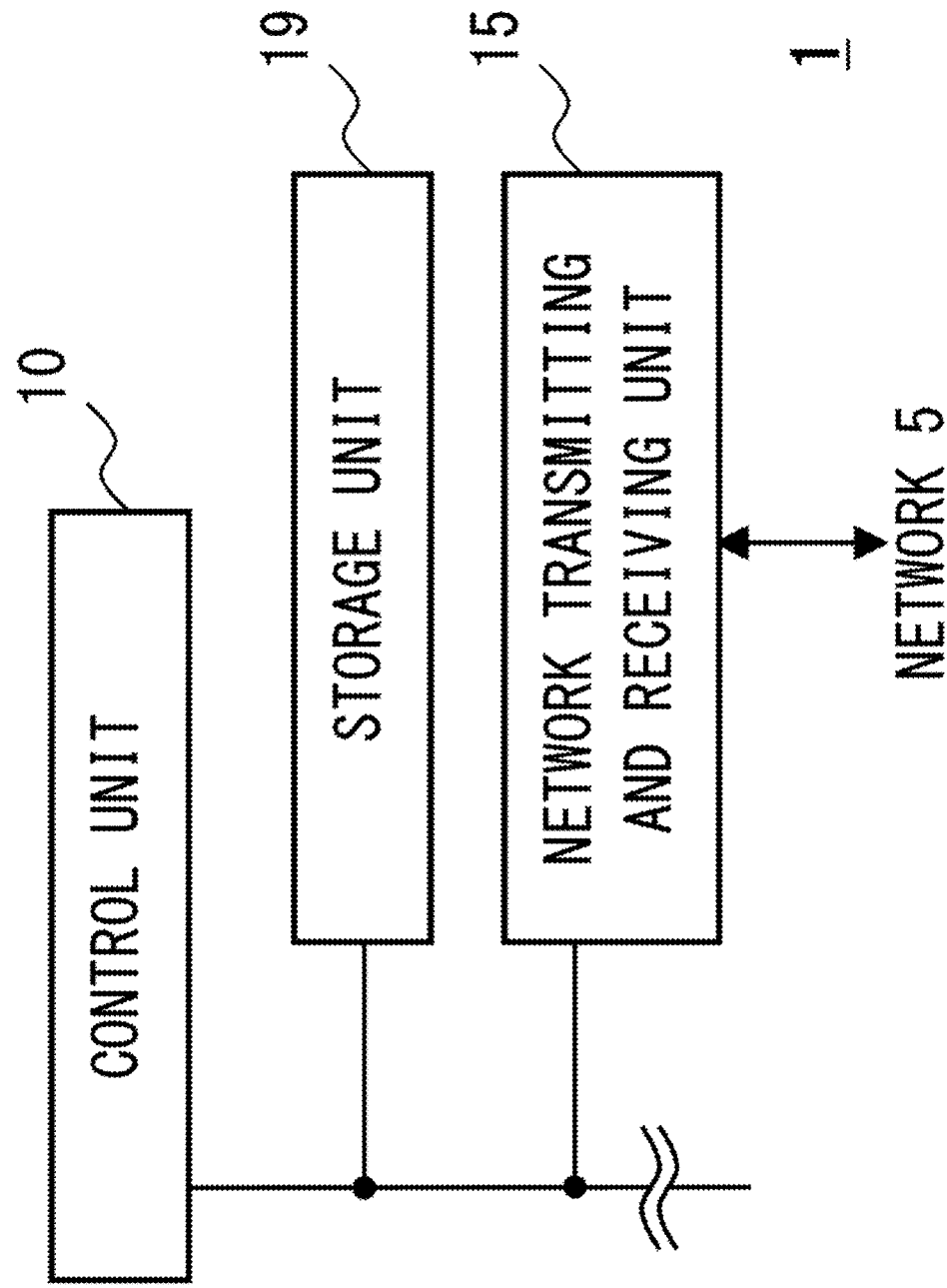
FIG. 2 is a block diagram showing a control configuration of the server as shown in FIG. 1.

Next, with reference to FIG. 2, the control configuration of the server 1 is described.

The server 1 includes a control unit 10, a network transmitting and receiving unit 15, a storage unit 19, and the like. Each unit is connected to the control unit 10 and its operation is controlled by the control unit 10.

The control unit 10 is an information processing unit that includes a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for a specific application), or the like.

The control unit 10 reads out the control program stored in the ROM or HDD of the storage unit 19, expands the control program in the RAM, and executes the control program, so that the control unit 10 can be operated as each part of the functional block as described later. Further, the control unit 10 controls the entire apparatus according to the instruction information input from the administrator terminal 3 or the console.

The network transmitting and receiving unit 15 is a network connection unit including a LAN board, a wireless transceiver, and the like, for connecting to the network 5. The network 5 according to the present embodiment is, for example, a LAN (Local Area Network), Wi-Fi, WAN (Wide Area Network), a mobile phone network, a voice telephone network, or the like.

The network transmitting and receiving unit 15 transmits/receives data on a data communication line, and it transmits/receives a voice signal on a voice telephone line.

storage unit 19 is a non-transitory recording medium such as a semiconductor memory, which is a ROM (Read Only Memory), a RAM (Random Access Memory), or the like, an HDD (Hard Disk Drive), or the like.

A control program for controlling the operation of the server 1 is stored in the ROM or HDD of the storage unit 19. The control program includes an OS (Operating System), middleware on the OS, services (daemons), various applications, database data, and the like. Among these, various applications include the above-mentioned printing process management application.

[Functional Configuration of Server 1]

Figure 3:
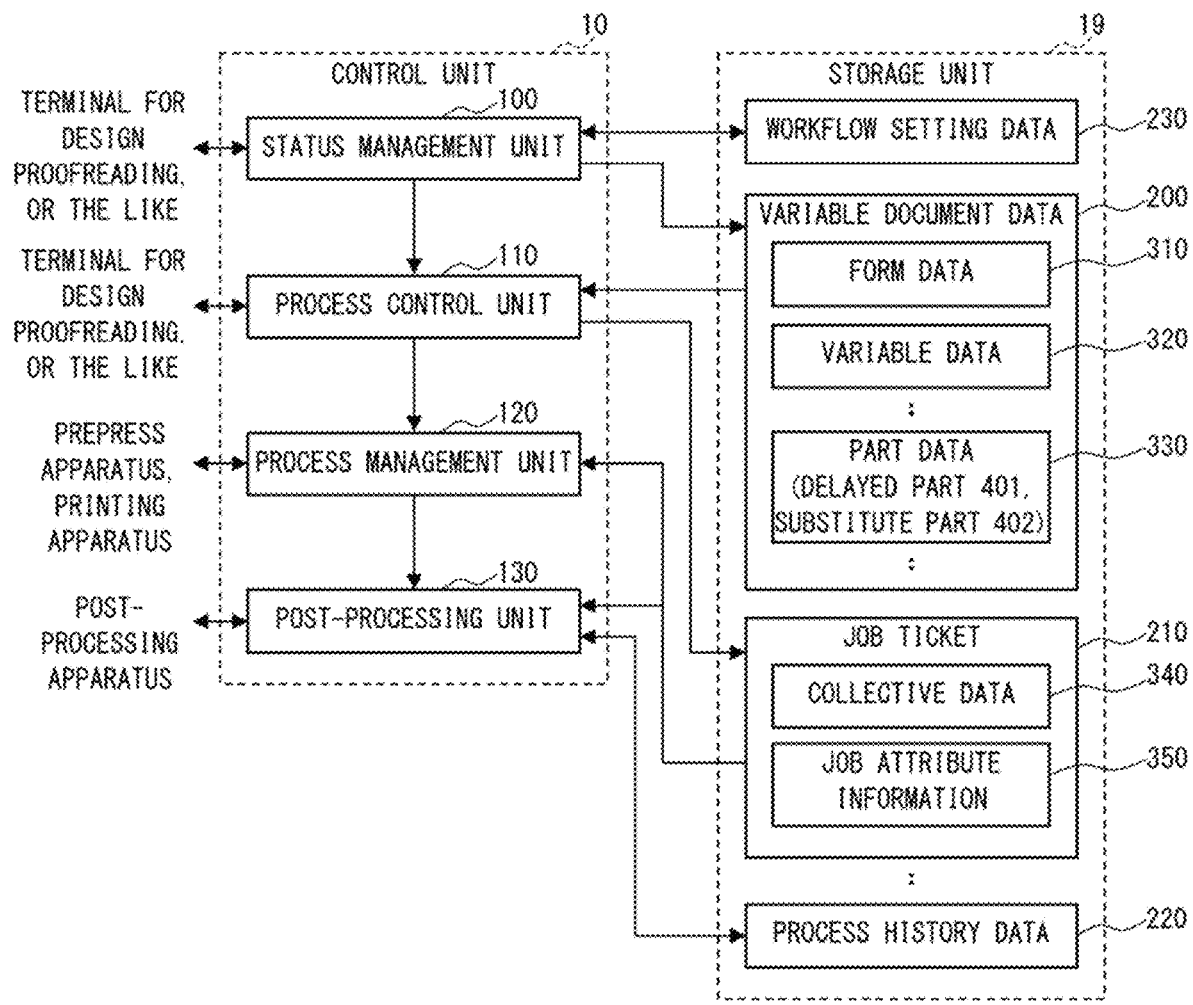
FIG. 3 is a block diagram showing a functional configuration of the industrial printing system according to an embodiment of the present disclosure.

Here, with reference to FIG. 3, the functional configuration of the server 1 is described.

The control unit 10 of the server 1 includes a status management unit 100, a process control unit 110, a process management unit 120, and a post-processing unit 130.

The storage unit 19 stores the variable document data 200, the job ticket 210, and the workflow setting data 230.

The status management unit 100 manages the design of the variable document data 200 according to the workflow setting data 230.

Specifically, the status management unit 100 manages the completion status of a plurality of records or a plurality of pages for variable printing. At this time, the status management unit 100 also manages the completion status of the part data 330 in which a "part" forming the page is stored.

The process control unit 110 creates a job ticket 210 that specifies prepress, printing, post-processing, and an output destination.

In the present embodiment, the process control unit 110 creates a job ticket 210 by using the substitute part 402 for the delayed part 401, which is the incomplete part data 330 managed by the status control unit 100. At this time, the process control unit 110 creates data of a link (hereinafter, referred to as "link data") that the substitute part 402 refers to the external data, and sets it in the job ticket 210. The external data may be a file stored in the storage unit 19, or a file, or the like, stored in the administrator terminal 3, the terminal for manuscript submission, the terminal for design proof-reading, or the prepress apparatus in the component apparatus 2, the external server, or the like (hereinafter, simply "terminals, or the like"). Further, the process control unit 110 stores positions of the records and pages including the substitute part 402 as the job attribute information 350 in addition to the link data of the substitute part 402.

In addition, the process control unit 110 can calculate the estimated delay time from the number of records used for the delayed part 401. Here, the process control unit 110 can calculate the overall estimated delay time in consideration of the dependency relationship between delayed parts 401. Further, the process control unit 110 may transmit the calculated estimated delay time including the dependency relationship to the terminal, or the like, and causes to display it on the terminal, or the like.

Further, the process control unit 110 can set whether to perform RIP process or to wait for the completed part or not from the estimated delay time of the record containing the substitute part 402 in the job ticket 210.

The process management unit 120 performs processing according to the job ticket 210.

In the present embodiment, the process management unit 120 causes the component apparatus 2 to execute each process according to the job ticket 210 created by the process control unit 110. The processes include prepress process and printing process. Instead of the printing process, the output destination may be an e-mail output or an electronic document output.

In addition, the process management unit 120 records the content of the prepress process for the page containing the substitute part 402 in the process history data 220. On this basis, when the completed part is acquired, the process management unit 120 refers to the process history data 220, performs the same process, and then replaces the substitute part 402 with the completed part.

At this time, when the process management unit 120 starts the RIP (Raster Image Processer) process or the printing process before all the completed records are prepared, the process management unit 120 selects only the completed records and performs the RIP process or the printing process.

Further, the process management unit 120 may use record order information recorded in the job ticket 210, which is described later, in the prepress process. Further, the process management unit 120 may use the page order information recorded in the job ticket 210 at the time of page insertion.

The post-processing unit 130 performs post-processing according to the job ticket 210 for the record or the page that has been performed prepress process or printing process by the process management unit 120. This post-processing includes instructions for collating processing and sorting processing.

The variable document data 200 is a file, a database, or the like that summarizes variable documents used at the time of variable printing and various data related thereto. The variable document data 200 may be described in, for example, JDF (Job Description Format) and/or JMF (Job Messaging Format).

The job ticket 210 is job data for causing the server 1 or each component apparatus 2 to execute processing by using the created variable document data 200. The job ticket 210 may be described in JDF (Job Description Format) and/or JMF (Job Messaging Format) as attribute data of processing, for example. For this job ticket 210, for example, prepress, printing, post-processing, and an output destination are specified, and commands, data, and the like, to be transmitted to the output destination are set.

The process history data 220 is data in which the prepress process of the page including the substitute part 402 is recorded. The process history data 220 includes the contents of processing in the prepress performed on the substitute part 402. The processing in the prepress includes, for example, preflight, fix-up, color adjustment, scaling, and the like. The content of each process of the process history data 220 may be described, for example, in JDF and/or JMF format as in the case of the job ticket 210.

The workflow setting data 230 is data for setting a workflow for creating an order which is a final product by combining job templates.

In the present embodiment, the workflow setting data 230 includes various setting data for suppressing delay when performing variable printing by the variable document data 200.

In addition, the workflow setting data 230 may include specified data (hereinafter, referred to as "template"). The template includes settings about what kind of job ticket 210 is generated. The template can also be shared. That is, it may be possible to centrally manage setting management such as changes. This management may be done in the same way as globally using an instance of a "class" as in an object-oriented language.

More specifically, in the present embodiment, the variable document data 200 includes the form data 310, the variable data 320, and the part data 330. These data may be included in the variable document data 200 as attribute data.

The form data 310 is data including a common form, or the like, used in variable printing. This form data 310 basically does not change at the time of printing, although the substitute part 402 may be replaced. The form data 310 may be, for example, data such as PDF (Portable Document Format), PDL (Page Description Language), and PPML (Personalized Print Markup Language) of XML (Extensible Markup Language) format, or the like. Among these, the PDF may be PDF/X, which is a subset of the standard PDF defined by the International Organization for Standardization (ISO15930), a simpler PDF, or the like.

In addition, the form data 310 may include layout information that defines the layout on the page, and the like. The layout information may include format information such as position (coordinates) and size on the page of the form, font size of variable data 320, left alignment, center alignment, right alignment, and the like. Further, the form data 310 may include data for explaining the definition and items of the variable data 320.

In the present embodiment, the form data 310 may be different for each page, or it may be a collection of data divided into page units (hereinafter, referred to as "page data"). In this case, different form data 310s may be prepared according to the page order, or different ones may be prepared according to the contents of the variable data 320.

In addition, the form data 310 may include completion information, delay information, and the like for each data on this page.

The variable data 320 is data for variable output that changes the print content at the time of printing. The variable data 320 may be, for example, data where printing changes for each copy. Therefore, the variable data 320 may be embedded in the variable document data 200 in a tabular format including a plurality of records, a database format such as XML, or the like.

Alternatively, the variable data 320 may be separately added as a file in a format that is easy to handle as a database. In this case, the variable data 320 may be a database such as a tab-separated or comma-separated file, a spreadsheet application file, another type of database file, a list file, or the like.

In the present embodiment, the variable data 320 may include information indicating whether or not the proof-reading has been completed (completion information), delay information, and the like, for each record. Further, the variable data 320 may also include link data of the part data 330, completion information and delay information as described later, information on whether or not the substitute part 402 is used, and the like.

The part data 330 may be, for example, image data such as jpg, gif, BMP, PNG, TIFF, PS (Postscript), a design file that is document data of text or other type, or another data. In the present embodiment, the design file is arranged on each page and RIP processed by the prepress process to form the page.

In the present embodiment, the part data 330 is directly included in the variable document data 200 as data or stored as link data.

The part data 330 also includes information on whether or not the substitute part 402 is used. In the part data 330, link data may be stored when the substitute part 402 is used.

Further, each part data 330 may include information indicating whether or not the proof-reading has been completed (hereinafter referred to as "completion information") and information indicating the expected time and delay time until the completion of the proof-reading (hereinafter referred to as "delay information"), and the like.

Among these, the completion information may be, for example, information indicating the degree of completion such as first proof-reading completed, second proof-reading completed, third proof-reading completed, fourth proof-reading completed, . . . , color proofed, completed, or the like. That is, as the completion information of the delayed part 401, the completion level becomes other than "completed". In addition, as for the substitute part 402 as described later, the completion information of the delayed part 401 may be copied and retained.

The delay information may be information, or the like, calculated from the completion level of the completion information or time when the completion level changes.

In the present embodiment, the job ticket 210 includes collective data 340 and job attribute information 350.

The collective data 340 is data obtained by collecting data of completed records or pages that can be output from the form data 310 and the variable data 320. The collective data 340 may include record data and page data. In addition, the collective data 340 may include the link data of the part data 330.

The job attribute information 350 is data including various information of attributes related to the job of the collective data 340.

Here, in the present embodiment, the job attribute information 350 includes the completion information, the delay information, and the like for the substitute part 402.

Further, the job attribute information 350 is data mainly including information in the record order of the records included in the collective data 340 and/or information in the page order of the pages. The record order may be information indicating the position of the record in the variable data 320, the number of entries, and the like. Further, the page order information may be page number information, page position information in RIP-processed print data, and the like.

In addition, the job attribute information 350 may include the completion information, the delay information, and the like for other records and/or pages. Further, the job attribute information 350 may include the completion information, the delay information, and the like for the part data 330 in each record or page. Furthermore, the job attribute information 350 may include setting information regarding whether or not the record order is specified.

In addition to this, the job attribute information 350 may include data created by the prepress process, correction contents from the workflow, processing results by offset printing, and the like. Further, the job ticket 210 may also include information changed according to the prepress process, the printing process, or the post process.

Here, the control unit 10 of the server 1 is made to function as a status management unit 100, a process control unit 110, a process management unit 120, and a post-processing unit 130 by executing the control program stored in the storage unit 19.

Further, each part of the server 1 described above becomes a hardware resource for executing the image forming method of the present disclosure.

In addition, a part or any combination of the above-mentioned functional configurations may be configured in terms of hardware or circuit by IC, programmable logic, FPGA (Field-Programmable Gate Array), or the like.

[Variable Data Processing by Industrial Printing System X]

Next, with reference to FIGS. 4 to 7, variable data processing by the industrial printing system X according to the embodiment of the present disclosure is described.

In the variable data processing of the present embodiment, first, the variable document data 200 is created. Then, for the parts that have not been completed, the job ticket 210 is created by using the substitute part 402. At this time, the substitute part 402 is created as link data, and the positions of the records and pages including the substitute part 402 are stored as job attribute information 350. Then, the prepress process or the printing process is performed by the created job ticket 210.

In the variable data processing of the present embodiment, the control unit 10 of the server 1 mainly executes the control program stored in the storage unit 19 in cooperation with each unit and uses the hardware resources.

Figure 4:
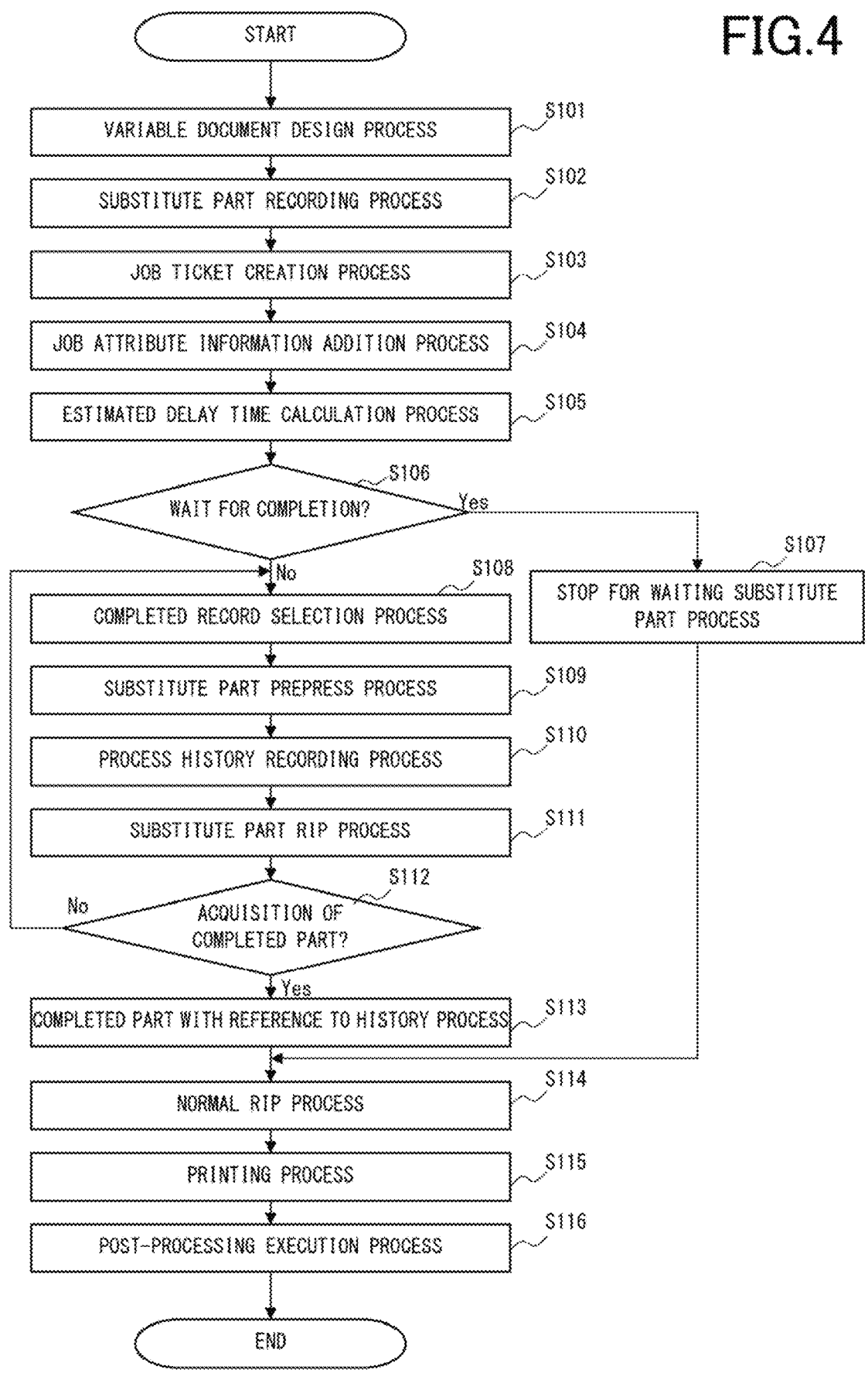
FIG. 4 is a flowchart of variable data processing according to the embodiment of the present disclosure.

Hereinafter, with reference to the flowchart of FIG. 4, the details of the processing by the server 1 is mainly described step by step.

(Step S101)

Firstly, the process control unit 110 and the status control unit 100 perform variable document design process.

Specifically, the process control unit 110 starts creating a variable document by using a template, or the like, included in the workflow setting data 230 according to an instruction of a user who is an administrator, or the like, and manages the creation of the variable document. Therefore, the process control unit 110 may provide a GUI (Graphical User Interface) or a CUI (Character-based User Interface) by a design application. On this basis, the process control unit 110 stores the created variable document as the variable document data 200 in the storage unit 19.

Further, the process control unit 110 can also set whether or not the substitute part 402 can be used. Furthermore, the process control unit 110 can also obtain a setting as to whether or not to prepress with the substitute part 402 without waiting for the completion.

Further, the process control unit 110 can perform a variable design by using the substitute part 402 for the part data 330 in a delayed state where the completion level has not been completed.

At the time of these settings, the process control unit 110 may use the template so that the settings can be commonly used even when other conditions are specified. In addition, when the user does not instruct the above-mentioned set value, the process control unit 110 can set the default set value by using the template.

Further, the status management unit 100 can also create the template itself by using the GUI or CUI. In addition, the status management unit 100 can also directly perform a program-like description specified by JDF and/or JMF, that is, by using a so-called "macro" language.

(Step S102)

Next, the status management unit 100 performs substitute part recording process.

The status management unit 100 designs a variable manuscript with the submitted data. Specifically, the status management unit 100 acquires and designs a variable document including each record and a component from the submission terminal of the component apparatus 2. At the time of these designs, the status management unit 100 manages the completeness level of the parts and manages whether or not the proof-reading is completed for each record and each page.

In the present embodiment, the status management unit 100 acquires and sets the completion information and the delay information for each part data 330 in the form data 310 of the variable document data 200 and each record of the variable data 320. At this time, the substitute part 402 may also be used.

In the present embodiment, when the substitute part 402 is used for the purpose of suppressing delay, or the like, the status management unit 100 records in the form data 310 or the variable data 320 that the substitute part 402 is contained in the record or the page. That is, the status management unit 100 can store the record and the page containing the substitute part 402. At this time, the status management unit 100 may acquire the completion level for each part data 330.

Further, the status management unit 100 may allow to be submitted the design for other parts in the variable document on condition that the substitute part 402 is used.

(Step S103)

Next, the process control unit 110 performs a job ticket creation process.

The process control unit 110 creates a job ticket 210 for which prepress, printing, post-processing, and output destination are specified according to the attributes of records and pages.

In the present embodiment, the process control unit 110 creates the job ticket 210 by using the substitute part 402 for the delayed part 401 managed by the status control unit 100. The process control unit 110 sets the substitute part 402 for the delayed part 401 in the job ticket 210 as link data so that the part data 330 that has been completed can be replaced later.

Figure 5:
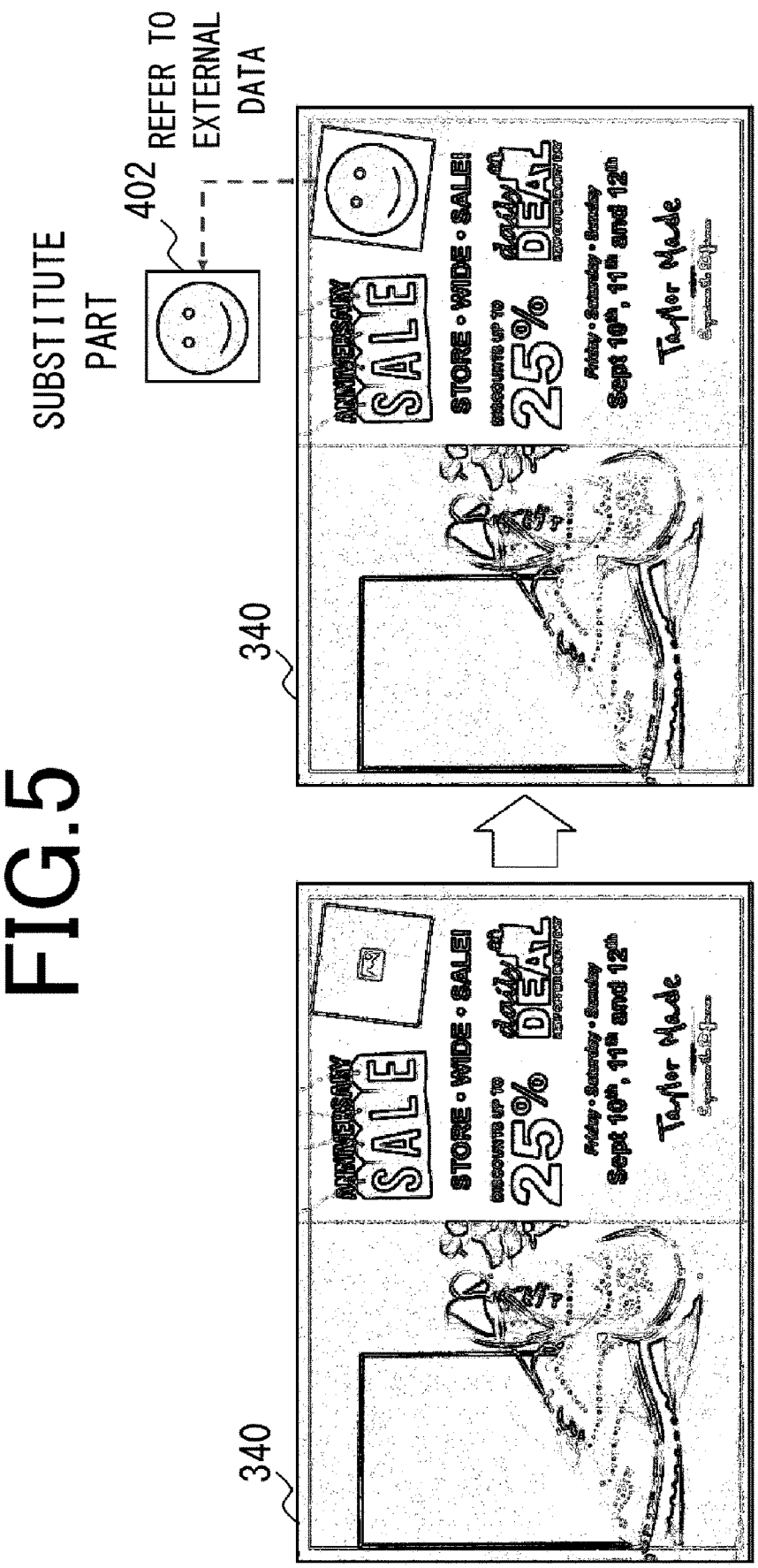
FIG. 5 is a conceptual diagram of links of substitute part in the variable data processing as shown in FIG. 4.

FIG. 5 shows an example in which the substitute part 402 is stored in the collective data 340 of the job ticket 210. Here, the substitute part 402 is stored as data that refers to external data, that is, the link data.

(Step S104)

Next, the process control unit 110 performs a job attribute information addition process.

The process control unit 110 stores the position of record and page including the substitute part 402 as job attribute information 350. That is, when the substitute part 402 is used for the delayed part data 330, the process control unit 110 sets the job attribute information 350 for the record order and the page order including the substitute part 402.

Specifically, the process control unit 110 records the record order of the record that has not been completed due to the use of the substitute part 402, or the like, in the job attribute information 350 in the job ticket 210. That is, assuming data in the case where the record order is meaningful, the record order in the variable data 320 of the variable document data 200 is recorded as the job attribute information 350. Further, the process control unit 110 records the page order of the pages that have not been completed due to the use of the substitute part 402 in the job attribute information 350 of the job ticket 210. Further, the process control unit 110 may record the information of the page that has not been completed in the job attribute information 350 as the page to be inserted later. This makes it possible to prevent the record from being misaligned and inserted. That is, it is possible to check that the record order is the same between the inserted page and the page to be inserted.

In addition, the process control unit 110 may add matching information according to the post-processing process to the job ticket 210. The matching information may be, for example, the part data 330 of the bar code in which the record order is recorded or the page order is recorded for each page.

That is, the process control unit 110 may add the dedicated part data 330 to be printed as a bar code, or the like, for the record order or the page order to the job ticket 210 so that it can be used in the post-processing process.

The following is an example of the job ticket 210 set in this way.

<insert-page syntax="xxx">
<value syntax="xxx">
  <insert-page-number syntax="integer">Insert page number</insert-page-number>
  <insert-page-recode-id syntax="integer">record number</insert-count>
</value>
</insert-sheet>

Further, the process control unit 110 can also store the completion information indicating the completeness level corresponding to the substitute part 402 in the job attribute information 350.

In this way, the process control unit 110 records the record order information, the page order information, and the like, in the job attribute information 350.

(Step S105)

Next, the process control unit 110 performs an estimated delay time calculation process.

The process control unit 110 can calculate the estimated delay time from the number of records used for the delayed part 401 that has not been completed.

Specifically, the process control unit 110 can calculate the estimated delay time by the following equation (1):

$$\text{Estimated delay time} = (\text{printing processing time of one record}) \times (\text{number of records including delayed part 401}) \quad \text{Equation (1)}$$

Here, if the process control unit 110 includes a plurality of delayed part 401 in one record, the process control unit 110 applies a dependency relationship of the delayed part 401 in the calculation of the estimated delay time.

The process control unit 110 can also display and notify the calculated estimated delay time by the delayed part 401 to the terminal, or the like. As a result, the estimated delay time can be referred from each apparatus in the proofreading process and the prepress process.

FIG. 6 shows a screen example 500 in which the estimated delay time calculated in a state where the delayed part 401 has a dependency relationship is displayed on a terminal, or the like. In the screen example 500, the delay time of the part data 330 itself and the delay time including dependent part data 330 are displayed as the estimated delay times so that they can be referred from each apparatus.

Here, the process control unit 110 determines whether to perform RIP process on the substitute part 402 or wait for the completed part data 330 from the estimated delay time of the record including the substitute part 402 in the job ticket 210, automatically. Otherwise, the process control unit 110 is also possible to let the user select this decision.

Alternatively, the process control unit 110 may be set to wait until a time that becomes a set threshold value, and if the completed part data 330 for the substitute part 402 cannot be acquired, proceed to the RIP process.

FIG. 7 shows a screen example 501 when selecting whether or not to proceed to RIP process from the estimated delay time in this way. Here, in the dialog box D, an example is shown in which the user is made to select "Wait for completion?". If the user determines that the RIP process and the printing process are possible based on the completion level of the substitute part 402, and the like, the user may select not to wait for the completion.

The process control unit 110 sets these selections and the threshold value in the job ticket 210.

(Step S106)

Next, the process control unit 110 determines whether or not to wait for the completion. If the variable document data 200 is set to wait for the completed part data 330 for the substitute part 402, the process control unit 110 determines Yes. If it is set not to wait for the completed part, the process control unit 110 determines No.

In the case of Yes, the process control unit 110 advances the process to step S107.

In the case of No, the process control unit 110 advances the process to step S108.

(Step S107)

If waiting for the completion, the process control unit 110 performs a stop for waiting substitute part process.

Specifically, the processing management unit 120 stops the execution of the processing of the page including the substitute part 402 before the prepress process or the printing process. The processing management unit 120 performs this stop until the delayed part 401 corresponding to the substitute part 402 has been completed.

On the other hand, the process management unit 120 may proceed to the RIP process of the following prepress process or printing process for the page that does not contain the substitute part 402.

When the completed part data 330 corresponding to the substitute part 402 is acquired, the process control unit 110 advances the process to step S114.

(Step S108)

If it does not wait for the completion, the process management unit 120 performs a completed record selection process.

If the user is set to start the RIP process or the printing process before all the completed records are prepared, the process management unit 120 selects the completed records (record designation) and stores them to the collective data 340 in the job tickets 210. At this time, a record containing the substitute part 402 may be included in the selection.

(Step S109)

Next, the process management unit 120 performs the substitute part prepress process.

The process management unit 120 performs RIP process or printing process on the completed records. The completed records may include a substitute part 402, as described above.

That is, in the present embodiment, the process management unit 120 can sequentially perform RIP process and printing process on the records in which the completed part data 330 are prepared.

(Step S110)

Next, the process management unit 120 performs a process history recording process.

The process management unit 120 records the content of the prepress process of the page including the substitute part 402 in the process history data 220.

The processing management unit 120 acquires the content of the prepress that is executed based on the job ticket 210 from the prepress apparatus of the component apparatus 2 and stores it in the process history data 220. The contents of the prepress include, for example, preflight, fix-up, color adjustment, scaling, and the like.

(Step S111)

Then, the process management unit 120 performs a substitute part RIP process.

Here, the process management unit 120 causes the job ticket 210 to be RIP-processed by the prepress apparatus of the component apparatus 2.

Here, the RIP-processed print data may be added with matching information for the record including the substitute part 402 to insert the completed part data 330 later. The matching information may be, for example, part data 330 such as a barcode drawn in the page margin, or the like.

(Step S112)

Next, the process control unit 110 determines whether or not the completed part has been acquired. The process control unit 110 determines Yes if, about the page RIP processed by the substitute part 402, the actual part data 330 for the substitute part 402 have been completed, and all of them are acquired from the terminal for manuscript submission or the terminal for design proofreading in the component apparatus 2. In other cases, the process control unit 110 determines No.

In the case of Yes, the process control unit 110 advances the process to step S113.

In the case of No, the process control unit 110 returns the process to step S108, and it continues the record selection and the prepress process by using the substitute part 402.

(Step S113)

Here, the process management unit 120 processes a completed part with reference to history process.

The process when the process management unit 120 has been able to acquire the completed data of the delayed part 401 corresponded to the substitute part 402 is described.

In the present embodiment, the process management unit 120 refers to the process history data 220, performs almost the same process as the replacement part 402 for the delayed part 401 that has been completed, and then replaces the delayed part 401 with the replacement part 402. Specifically, when the process management unit 120 can acquire the delayed part 401 that has been completed, it acquires the delayed part 401 via the link data and replaces it with the substitute part 402. Then, the process management unit 120 refers to the history information in the process history data 220 and executes the same process as the content of the prepress on the record and/or the page including the delayed part 401 replaced with the completed one.

In this case, the processing management unit 120 can proceed with the variable printing process by acquiring the page for which all the actual delayed parts 401 have been acquired and thus has been completed as the completed page.

(Step S114)

Here, the process management unit 120 performs a normal RIP process.

The process management unit 120 performs a process of executing a job on each component apparatus 2 by the job ticket 210.

Specifically, the process management unit 120 replaces the page including the substitute part 402 with the corresponding delayed part 401 that is completed, and then it executes the RIP process. That is, the process management unit 120 causes the job ticket 210 in which the substitute part 402 is replaced to be RIP-processed by the prepress apparatus of the component apparatus 2.

As a result, print data is generated and transmitted to the printing apparatus. Alternatively, the process management unit 120 may perform RIP process by using the job ticket 210 that has been proof-read after printing.

At this time, the process management unit 120 can use the record order information recorded in the job ticket 210 in the prepress process.

(Step S115)

Next, the process management unit 120 performs a printing process.

The process management unit 120 causes the printing apparatus of the component apparatus 2 to perform printing based on the print data generated by the RIP process.

The printed printing paper is conveyed to the post-processing apparatus of the component apparatus 2.

(Step S116)

Next, the post-processing unit 130 performs post-processing execution process.

The post-processing unit 130 causes the component apparatus 2 to perform processing by the post-processing apparatus, the shipping management server, and the like. At this time, the post-processing unit 130 performs post-processing according to the job ticket 210 for the record or the page that has been performed prepress process or printing process by the process management unit 120. Specifically, the post-processing unit 130 causes the post-processing apparatus of the component apparatus 2 to execute the collating process and the sorting process. Here, the post-processing unit 130 can also refer to the record order and page order information recorded in the job attribute information 350 in the job ticket 210 and use them for sorting and page insertion.

In the present embodiment, if the job attribute information 350 of the job ticket 210 has the record order designation, the post-processing unit 130 may wait until another record manuscript is printed and perform collating process according to the designation. Alternatively, the post-processing unit 130 may wait until another page manuscript is printed, and it performs collating process according to the insertion page designation.

More specifically, for example, the post-processing unit 130 refers to the record order information and the page order information from the job attribute information 350 in the job ticket 210. According to this, the post-processing unit 130 causes the collating apparatus or sorter of the post-processing apparatus to execute the reordering process for the records in the order of records and the order of pages.

Alternatively, the post-processing unit 130 may perform a process of reading the barcode, or the like, of the printed page with a camera or a scanner and rearranging the printed pages in the order of records and the order of pages.

Further, the post-processing unit 130 may perform sorting under conditions different from the record order and execute collating process. For example, it is possible to perform a process of "collating" the address in the record and collecting only the specific address.

In addition, the post-processing unit 130 may process the printed matter for which the post-processing has been completed by the shipping management server.

As the above, it completes the variable data process according to the embodiment of the present disclosure.

As configured in this way, the following effects can be obtained.

Printed matter in typical production printing is composed of multiple parts, each of which is designed and manufactured separately.

In general, there are the following process before the printed matter is completed:
(1) Ordering
(2) Specification confirmation
  Product Contents
  Schedule
  Cost Estimation
(3) A) Typesetting, Design, and Proof-reading
  Do until the end of proof-reading
  B) Complete data submission
(4) Completion (of Proof-reading)
(5) Printing
(6) Post-processing (Bookbinding)
(7) Delivery Here, in a typical variable printing, in the process (3), the printing process cannot be proceeded unless all the pages have been completed or the complete data has been submitted. That is, it was not possible to proceed to the next process work such as prepressing and printing until all the parts were prepared.

For this reason, the delivery date may be delayed due to the delay of a specific part.

In particular, in variable printing, since it is possible to design differently for each record, the number of parts is increased and the risk of delay is further increased.

On the other hand, the server 1 of the industrial printing system X according to the present embodiment is a server of an industrial printing system that performs variable printing by production printing, including: a status management unit 100 that manages the completion status of a part on a page for variable printing; a process control unit 110 that creates a job ticket 210 by using a substitute part 402 for incomplete delayed part 401 managed by the status management unit 100, creates a substitute part 402 as link data, and stores the positions of records and pages containing the substitute part 402 as job attribute information 350; a process management unit 120 that performs prepress process or printing process by the job ticket 210 created by the process control unit 110; and a post-processing unit 130 that performs post-processing according to a job ticket 210 for a record or a page that has been performed prepress process or printing process by the process management unit 120.

With this configuration, in variable printing, it is possible to proceed the process by using the substitute part 402 without waiting for the completion of all the delayed part 401. After that, by proceeding to the prepress and printing work of the next process, the overall delay can be minimized. That is, the risk of delay can be suppressed by proceeding to the prepress and printing work of the next process without waiting for the delayed part 401 that has been completed. Therefore, it can be expected that the total cost up to the output of printed matter can be suppressed.

In the server 1 of the industrial printing system X according to the present embodiment, the process control unit 110 calculates estimated delay time from the number of records used for the delayed part 401 that has not been completed.

With this configuration, the estimated delay time allows the user to proceed with the process while considering the completion level of proof-reading. Therefore, it is possible to improve the predictability until the completion of the order for the production printing and deal with troubles, and the like.

In the server 1 of the industrial printing system X according to the present embodiment, the process control unit 110 selects whether to perform RIP process or waits for completed part by the estimated delay time of the record containing the substitute parts 402 in the job ticket 210.

With this configuration, the user can select whether or not to perform prepress, or automatically proceed to the next process, depending on the estimated delay time. As a result, when it is better to wait for the completion of proof-reading, it is possible to wait and then process, which can reduce the time and effort. As a result, the risk of delay can be further reduced.

In the server 1 of the industrial printing system X according to the present embodiment, the process management unit 120 records the prepress process of the page containing the substitute part 402 in the process history data 220, and when the delayed part 401 that has been completed is acquired, performs the same process with reference to the process history data 220, and then replaces the substitute part 402.

With this configuration, even if the prepress process is performed with the substitute part 402, when the delayed part 401 that has been completed later is acquired, the RIP process can be executed after performing the same process. This makes it possible to perform exactly the same printing with and without the substitute part 402.

In the server 1 of the industrial printing system X according to the present embodiment, when the RIP process or the printing process is started before all the completed records are collected, the process management unit 120 selects only the completed records and performs RIP process or printing process.

With this configuration, the completed records can be RIP-processed first, and the risk of delay can be further reduced. Further, the process can be proceeded by using the substitute part 402 without waiting for the completion of all the records.

OTHER EMBODIMENTS

In the above-described embodiment, an example of printing and performing post-processing has been described.

However, the process management unit 120 may output an e-mail and an electronic document instead of printing. Alternatively, the process management unit 120 may send an e-mail to the shipping management server of the component apparatus 2 and manage the e-mail together with the printed output. Further, a job ticket 210 for other processes such as changing the process for inspecting after output may be created.

Further, in the above-described embodiment, an example is described in which a job ticket 210 described in JDF and/or JMF is created and each processing of a variable document is performed. However, it may be configured to perform the same control as the job ticket 210, such as directly controlling each apparatus without creating a JDF and/or a JMF.

By configuring in this way, various configurations can be supported.

Further, in the above-described embodiment, the proper use of the prepress apparatus and the printing apparatus of the component apparatus 2 has not been described.

However, the output destination may be selected from a plurality of apparatuses according to the proof-reading status of the record, the page, or the part data 330 in the page, or the like. That is, it is also possible to select and output a high-speed prepress apparatus or a digital printing apparatus according to the completion information or the delay information, for example, when there is a delay.

Further, when the number of records is small, when printing is performed in a small lot, or the like, it is possible to specify a condition that printing is performed only by a digital printing apparatus without using an offset printing apparatus. Further, the offset printing apparatus and the digital printing apparatus may be used properly depending on the record priority mode and the page priority mode or depending on the completion information and the delay information. Alternatively, a digital printing apparatus may be used for a job ticket 210 in which the number of specific records or a specific number of pages is smaller than a specific threshold value, and an offset printing apparatus may be used when the number of specific records or a specific number of pages is equal to or greater than the specific threshold value.

With this configuration, various conditions can be set to perform variable printing that is actually required in an industrial printing system.

Further, in the above-described embodiment, an example of calculating the estimated delay time from the number of the records used has been described.

However, the estimated delay time may be calculated in more detail in consideration of the number of incomplete part data 330 used on the page, the number of pages, the completion level, and the like.

Further, in the above-described embodiment, although the part data 330 having the dependency relationship has been described by simply adding time, if the part data 330 having the dependency relationship is created in parallel, the waiting time, and the like, may also be taken into consideration.

Further, in the above-described embodiment, an example has been described in which whether to perform RIP process or to wait for the complete part is automatically selected from the estimated delay time by the threshold value.

In addition to this, it is also possible to set the threshold itself, automatically. Specifically, an appropriate threshold value can be set based on the estimated delay time and the replacement time of the RIP process. Alternatively, the threshold value may be automatically set according to the number of records, the attributes and types of the template and the variable document data 200, the number of part data 330 and the substitute part 402, and the like.

For example, if there are more records than a specific number, the threshold may be set to a shorter time than otherwise, assuming that the replacement may take longer. Otherwise, if there are many part data 330 and substitute part 402 that are commonly used on the page, or if the number of part data 330 itself is small, the threshold value may be longer so that the prepress process can proceed further.

Further, from these, the threshold value may be set by using machine learning, a statistical model, or the like.

With such a configuration, the risk of delay can be further suppressed.

In the above-described embodiment, an example of automatically generating a job ticket 210 by the process management unit 120 has been described.

However, it may be possible for the user to directly create the job ticket 210 according to the setting of the condition by the process control unit 110.

Further, in the above-described embodiment, an example in which the job ticket 210 is attribute data of processing such as JDF and/or JMF is described. However, the job ticket 210 may also be capable of using data in a format such as a macro language or a programming language.

Further, in the above-described embodiment, as the production printing, an example of variable printing on a printed matter of paper, sending an e-mail, and outputting an electronic document is described, but the present embodiment can also be applied to other production printing.

For example, it is also applicable to variable book printing, on-demand printing, and other printing.

Further, for example, it can be used for split printing of large-format posters, sheet printing of exteriors and interiors of aircraft and automobiles, manufacturing of electronic parts such as flat displays and electronic substrates, printing of cultured cells, and the like. In this case, as the component apparatus 2, an industrial inkjet printer, an industrial robot, various reaction apparatuses, a culture apparatus, and the like can also be used.

With this configuration, it can be used for various purposes.

Further, in the above-described embodiment, an example in which various processes are performed on the server 1 has been described.

However, a dedicated terminal for creating variable data 320 may be used, another server for managing workflow may be used, prepress process may be performed via the administrator terminal 3, or an e-mail transmission server may be used. Further, the configuration may be such that the job ticket 210 is created and controlled by another apparatus.

Further, it is needless to say that the configuration and operation of the above-described embodiment are examples and can be appropriately modified and executed without departing from the aim of the present disclosure.

What is claimed is:

1. An industrial printing system that performs variable printing by production printing, comprising:
   a status management unit configured to manage completion status of a part on a page for the variable printing;
   a process control unit configured to create a job ticket by using a substitute part for an incomplete part managed by the status control unit, create the substitute part as link data, and save a position of a record and a page containing the substitute part as job attribute information; and
   a process management unit configured to perform prepress process or printing process by using the job ticket created by the process control unit.

2. The industrial printing system according to claim 1, wherein
   the process control unit calculate estimated delay time from number of records used for the part that have not been completed.

3. The industrial printing system according to claim 2, wherein
   the process control unit selects whether to perform RIP process or wait for completed part by the estimated delay time of the record containing the substitute part in the job ticket.

4. The industrial printing system according to claim 1, wherein
   the process management unit records prepress process of the page containing the substitute part as a process history,
   when completed part is acquired, performs same process with reference to the process history, and then replaces the substitute part with the completed part.

5. The industrial printing system according to claim 4, wherein
   the process management unit, when RIP process or printing process is started before all completed records are collected, selects only completed records and performs the RIP process or the printing process.

6. A server of an industrial printing system that performs variable printing by production printing, comprising:
   a status management unit configured to manage completion status of a part on a page for the variable printing;
   a process control unit configured to create a job ticket by using a substitute part for an incomplete part managed by the status control unit, create the substitute part as link data, and save a position of a record and a page containing the substitute part as job attribute information;
   a process management unit configured to perform prepress process or printing process by using the job ticket created by the process control unit; and
   a post-processing unit configured to perform post-processing according to the job ticket for the record or the page that has been performed prepress process or printing process by the process management unit.

7. The server according to claim 6, wherein
   the process control unit calculate estimated delay time from number of records used for the part that have not been completed.

8. The server according to claim 7, wherein
   the process control unit selects whether to perform RIP process or wait for completed part by the estimated delay time of the record containing the substitute part in the job ticket.

9. The server according to claim 8, wherein
   the process management unit records prepress process of the page containing the substitute part as a process history,
   when completed part is acquired, performs same process with reference to the process history, and then replaces the substitute part with the completed part.

10. The server according to claim 9, wherein
    the process management unit, when RIP process or printing process is started before all completed records are collected, selects only completed records and performs the RIP process or the printing process.

11. A variable printing method executed by a server of an industrial printing system that performs variable printing by production printing, comprising the steps of:
    managing completion status of apart on a page for the variable printing;
    creating a job ticket by using a substitute part for an incomplete part that is managed;
    creating the substitute part as link data;
    saving a position of a record and a page containing the substitute part as job attribute information; and
    performing prepress process or printing process by using created job ticket.

12. The variable printing method according to claim 11, wherein
    calculating estimated delay time from number of records used for the part that have not been completed.

13. The variable printing method according to claim 12, wherein
    selecting whether to perform RIP process or wait for completed part by the estimated delay time of the record containing the substitute part in the job ticket.

14. The variable printing method according to claim 11, wherein
    recording prepress process of the page containing the substitute part as a process history,
    when completed part is acquired, performs same process with reference to the process history, and then replaces the substitute part with the completed part.

15. The variable printing method according to claim 14, wherein
    selecting, when RIP process or printing process is started before all completed records are collected, only completed records and performs the RIP process or the printing process.

* * * * *